E. T. SHORTT.
COFFEE ROASTER.
APPLICATION FILED MAY 6, 1918.

1,299,245.

Patented Apr. 1, 1919.
3 SHEETS—SHEET 1.

WITNESSES

INVENTOR
Everett T. Shortt
BY
ATTORNEYS

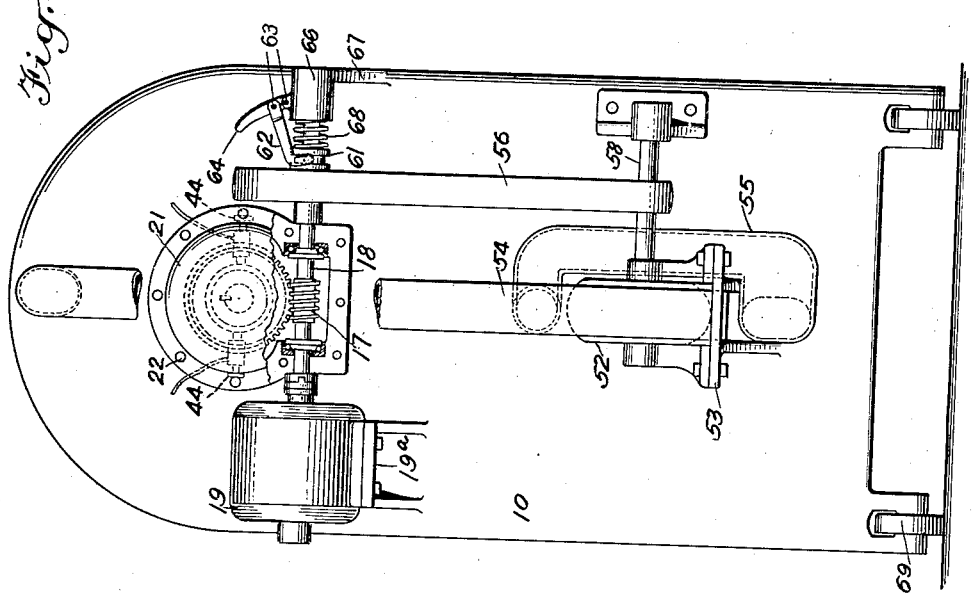
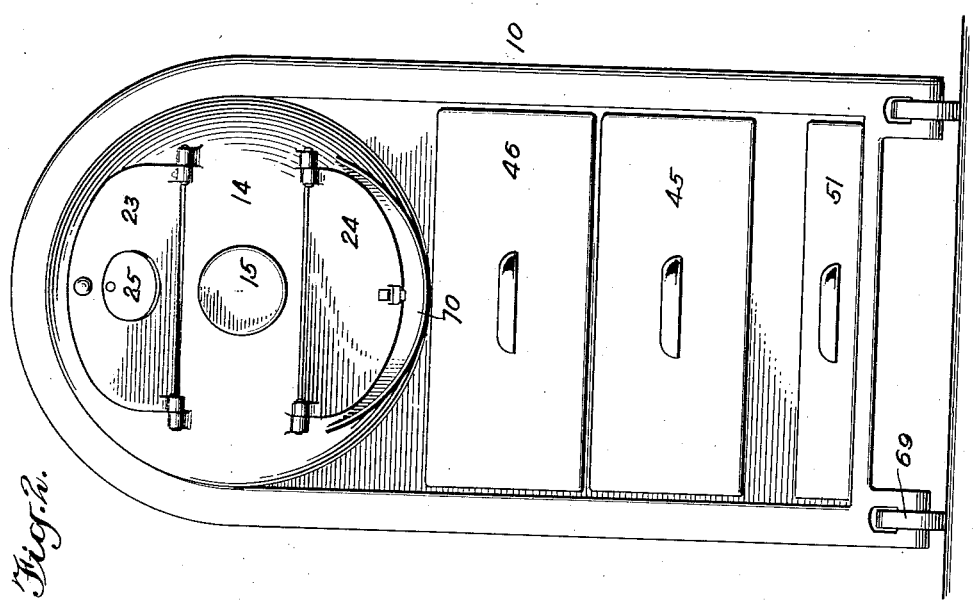

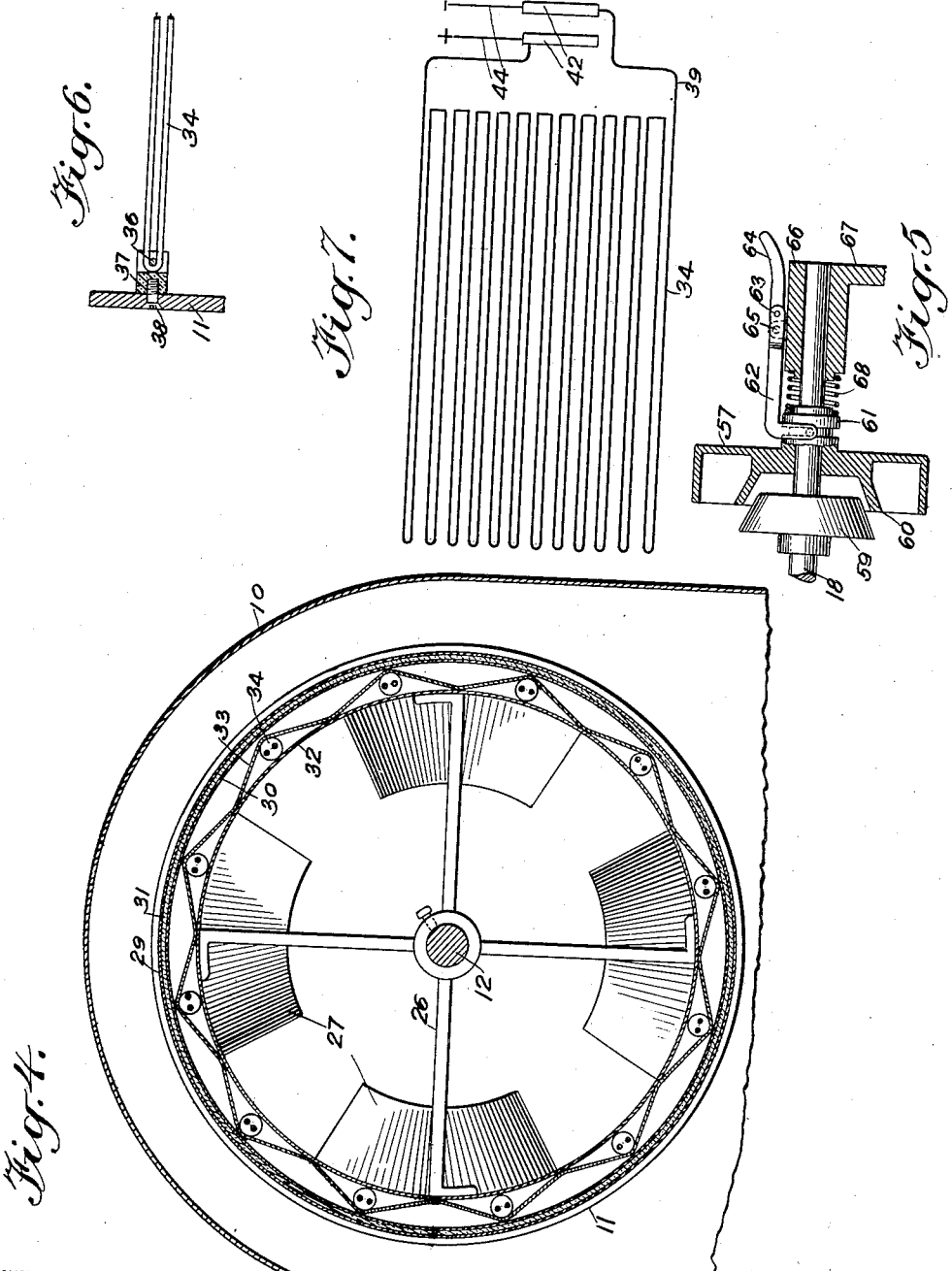

UNITED STATES PATENT OFFICE.

EVERETT T. SHORTT, OF DALLAS, TEXAS.

COFFEE-ROASTER.

1,299,245.      Specification of Letters Patent.      Patented Apr. 1, 1919.

Application filed May 6, 1918. Serial No. 232,793.

*To all whom it may concern:*

Be it known that I, EVERETT T. SHORTT, a citizen of the United States, and a resident of Dallas, in the county of Dallas and State of Texas, have invented a new and improved Coffee-Roaster, of which the following is a description.

My invention relates to roasters especially designed for roasting coffee. More particularly the invention relates to roasters of the general form illustrated in United States Patent No. 1,122,651, granted to me December 29th, 1914, which, among other things, is characterized by a roasting drum self-contained with respect to its heating means and by a suction means, the heating means of the self-contained drum consisting of electric heating elements thereby doing away with the noxious fumes and products resulting from ordinary heating means, and the suction means serving to draw off the moist vapors driven out of the coffee beans.

General objects of the present invention are to provide a roaster, the use of which results in important advantages among which are a sanitary system of roasting coffee and an increased conservation of the strength of the coffee over ordinary roasting methods.

Advantages of the present construction also, are an efficient application of the electric heat as well as an effective agitation of the coffee while roasting, whereby with the improved arrangement of the heating means a more even and uniform roast results.

A further object of my improved construction is obtained in utilizing the agitating means of the drum to effect the discharge of the roasted beans.

The present invention is characterized also by a novel means and manner of directing the roasted coffee from the drum to the receiving drawer therefor with the incidental subjection to an air current, of the roasted coffee as it is being dumped as well as after being dumped.

Reference is to be had to the accompanying drawings forming a part of this specification, it being understood that the drawings are merely illustrative of one example of the invention.

Fig 2 is a front end view thereof;

Fig. 3 is a rear end view, parts being broken away and others in section;

Fig. 4 is a transverse vertical section on an enlarged scale through the heating drum and the upper part of the casing, the view being taken on the line 4—4, Fig. 1;

Fig. 5 is a detail sectional side elevation of the clutch employed on the drive shaft;

Fig. 6 is a fragmentary sectional view illustrating one manner of detachably securing an end of a replaceable heating element;

Fig. 7 is a diagram of the electric heating circuit.

Figure 1:
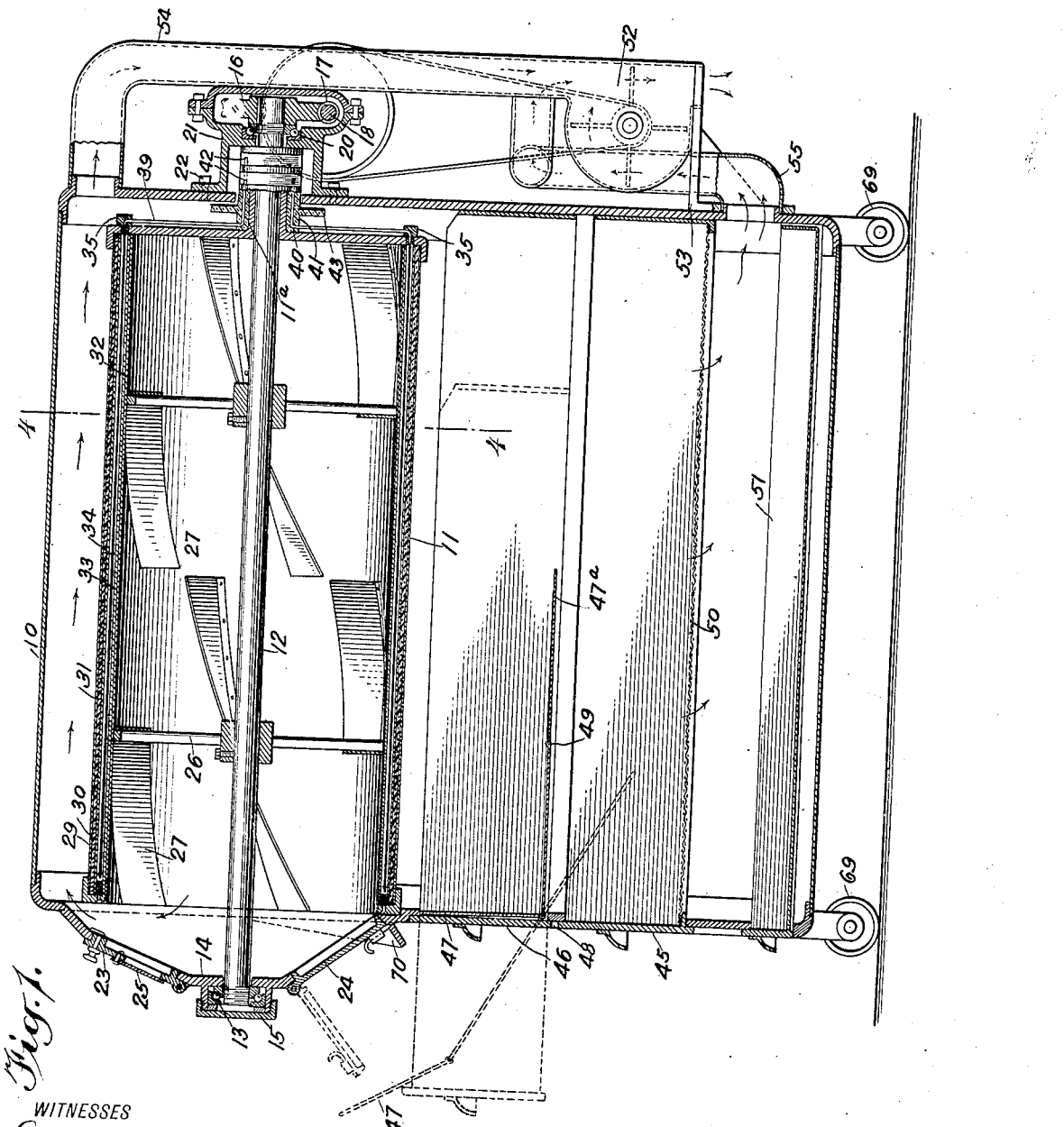
Figure 1 is a longitudinal vertical section of a coffee roaster embodying my invention.

In constructing a practical embodiment of my present invention a suitable casing 10 is provided in which a drum 11 is horizontally arranged and carried on a shaft 12. One end of the shaft turns in ball bearings 13 in a head 14 on said casing, said bearings having a dust cap 15. At the opposite end of the shaft the same has keyed thereon a worm wheel 16 meshing with which is a worm 17 on a drive shaft 18, exterior of the casing 10 and driven preferably by an electric motor 19 mounted on a bracket 19$^a$ on the casing. The shaft adjacent to the worm 16 turns in a ball bearing 20, a casing 21 inclosing the wheel and worm, said casing being suitably secured to the main casing 10 by bolts 22 or the like. In the head 14, which is at the front of the machine, there is a door 23 at one side of the shaft 12 through which the drum 11 may receive a charge of coffee to be roasted, and at the opposite side of the center of said head a second door 24 is provided through which the coffee is discharged as hereinafter explained. Said door 23 is provided with an opening ordinarily closed by a pivoted disk 25 through which opening a sampling scoop may be entered for testing the coffee. The drum 11 is supported on the shaft 12 by spokes 26 or equivalent means and these serve also to secure an annular series of curved blades 27 for agitating the coffee and causing the roasted coffee to be discharged.

The drum 11 in the illustrated form comprises an outer sheet metal shell 29 and a second sheet metal shell 30 at the interior of the shell 29 and spaced therefrom, there being between said shells heat-insulating material 31. The cylindrical sheet metal lining 32 of the shell is spaced from the shell 30 and the intervening annular space accommodates a zig-zag sheet metal partition 33 which divides the said annular space alternately into inner and outer air chambers extending longitudinally of the drum as clearly seen in Fig. 4. In each of the inner chambers between the partition 33 and the lining 32 are longitudinally disposed electric heating elements 34 which may be of any approved form. As an example of a removable heater element (see Fig. 6), a wire 34 extends longitudinally of the drum at each heating element and is return bent about a transverse pin 36 on an insulating block 37 secured by screws 38 or other removable fasteners to the front end of the drum 11, so that the front end of each heating element can be detached. The heating elements are passed through the rear end of the drum 11, the numeral 35 indicating insulating knobs at the rear end of each heating element. The numeral 39 indicates strips of copper or other suitable metal extending from the heater elements 34 through the knobs or blocks 35 and extending radially inward to an insulating sleeve 40 on the hub 11$^a$ of the drum 11, said strips connecting with a commutator or distributing rings 42, the numeral 44 indicating brushes to contact with said rings. The numeral 43 indicates a flange or collar on the sleeve 40 to exclude dust or chaff from the commutator and the adjacent ball bearing 20. The above arrangement of the drum and heating units results in a uniform and effective application of the heat by reason of the air chambers formed between the elements 30, 32 and permits of the ready replacement of the individual heating elements as required.

The numeral 45 indicates a drawer or sliding receptacle for receiving the roasted coffee and 46 indicates a drawer above the drawer 45 having a chute element 47 therein constituting a dumping bottom for said drawer 46. The element 47 consists of an upstanding front member and a bottom member 47$^a$ pivoted as at 49 to the sides of the drawer 46 and articulated as at 48 to the upstanding member. Thus, with the drawer 49 drawn outward as indicated in dotted lines, Fig. 1, the element 47 can be positioned with the bottom member 47$^a$ thereof at an incline and the upstanding member at an angle thereto, as indicated in dotted lines, whereby when the door 24 is open the roasted coffee will be received by the chute 47 and directed to the drawer 45. The drawer 45 has a perforated bottom 50 and is elevated above a dust or chaff tray 51 in the bottom of the casing 10. A suction fan 52 is suitably mounted on the casing 10 at the exterior here shown as on a bracket 53 and connects by a pipe 54 with the casing 10 at the top and by a pipe 55 with the casing near the bottom below the drawer 45. The fan is driven by a belt 56 which runs over a pulley 57 on the drive shaft 18 and over a pulley on the fan shaft 58. A clutch is provided to establish or disestablish driving connection between the shaft 18 and the fan shaft, for which purpose, suitable clutch elements 59, 60 are provided on the shaft 18 and on the pulley 57 and the latter pulley is shiftable, being provided with a shifting collar 61 and engaged by a shifting fork 62. Said fork is pivoted as at 63 to a lever 64 between the ends of the latter, said lever being fulcrumed at one end as at 65 on the bearing 66 provided for the adjacent end of the shaft 18, said bearing in the illustrated example being on a bracket 67 on the casing 10. A compression spring 68 is coiled about the shaft 18 between the bearing 66 and the collar 61 and normally tends to maintain the driving clutches in engagement, whereas the lever 64 may be thrown to the position indicated in Fig. 5 to disengage the clutches and maintain the same out of engagement.

The operation of the fan serves to draw off the moisture from the drum 11 and the interior of the casing 10 and also serves to draw off the moist vapors from the roasted coffee as the latter is passing from the door 24 down the chute 47 to the drawer 45. The fan also creates a current through the drawer 45 and its perforated bottom 55 and through the space between the said drawer and the shaft tray 51. The curved blades 27 serve to thoroughly agitate the coffee while being roasted and when the door 24 is open said blades act to discharge the coffee through said door to the chute 47.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In an apparatus of the class described, a rotary roasting drum including elements forming an inclosed annular space extending about the drum, a zig-zag partition dividing said space into series of alternate inner and outer air chambers, and means for heating the chambers of one series.

2. In an apparatus of the class described, a rotary roasting drum having a central roasting chamber and an annular air space outside of said roasting chamber, a zig-zag partition dividing said space into an annular series of air chambers, the chambers in the respective series alternating, and electric heating elements removably accommodated in the chambers of one series.

3. In an apparatus of the class described, a rotary roasting drum having a central roasting chamber and an annular series of air chambers about the drum outside of said roasting chamber, a longitudinal series of separate electric heating elements in the separate air spaces, said elements being removable through one end of the drum, and means to detachably fasten said elements separately at the opposite end of the drum.

4. In an apparatus of the class described, a rotary drum having a central roasting chamber, an annular series of separate electric heating elements disposed about the drum outside of said roasting chamber and ranging longitudinally of the drum, a shaft on which said drum is mounted, and a commutator on said shaft at one end connecting conductor strips extending from the commutator to the individual heating elements.

5. An apparatus of the class described including a casing, a drum mounted to turn in said casing, and means to drive the drum, said casing having an opening adjacent to one end of the drum, near the bottom of the latter, through which roasted material from the drum may be discharged, a receptacle in the casing below the drum for receiving roasted material, and means constituting a chute and slidably supported between the said receptacle and drum to be moved into the casing or to an outer position for receiving material from the drum and directing it to said receptacle.

6. An apparatus of the class described including a casing, a roasting drum mounted to turn in the casing, means to drive said drum, said casing having a discharge opening for the roasted material, a receptacle in the casing below the drum to receive the roasted material, a slide mounted in the casing between the drum and said receptacle, and a tiltable chute carried by said slide to move therewith to a position for the chute to lie within the casing or to an outer position to receive material from the drum and direct it into said receptacle.

7. An apparatus of the class described including a casing, a roasting drum mounted to turn in the casing, means to drive said drum, said casing having a discharge opening for the roasted material, a receptacle in the casing below the drum to receive the roasted material, a slide mounted in the casing between the drum and said receptacle, and a tiltable chute carried by said slide to move therewith to a position for the chute to lie within the casing or to an outer position to receive material from the drum and direct it into said receptacle, said chute including a bottom member pivotally mounted on the slide and an upstanding member having an articulated connection with the bottom member to assume different angular positions.

8. In an apparatus of the class described, a roasting drum, drive means therefor, including a drive shaft, a fan, connections between the fan and the casing, to exhaust vapors from the latter, a shaft on which the fan is mounted, driving connections between the first shaft and the fan shaft, and a clutch on the first-mentioned shaft, said clutch including an element fixed on the shaft, a sliding element, a spring acting on said sliding element and normally tending to maintain it in the clutching position, a shifting fork to move the sliding clutch element against the action of the spring, and a lever fulcrumed at one end and pivotally connected between its ends with said fork, said lever being movable to a position to permit the spring to engage the clutch element or to a position locking the sliding clutch element in the release position.

9. An apparatus of the class described, a drive shaft, a fixed clutch element, a sliding clutch element engageable with the first element or disengageable therefrom, a spring normally tending to maintain the sliding clutch element in engaged position, a clutch fork adapted to move the sliding clutch element to disengaged position against the action of said spring, and a lever fulcrumed at one end and pivotally connected between its ends with said fork, said lever being movable to a position to permit the spring to engage the clutch elements, or to a position approximately in line with the fork and acting to lock the fork against movement under the action of the spring.

EVERETT T. SHORTT.